US008902744B2

(12) United States Patent
Singamsetty et al.

(10) Patent No.: US 8,902,744 B2
(45) Date of Patent: Dec. 2, 2014

(54) BANDWIDTH ADVERTISEMENT MODEL FOR SHARED MESH PROTECTION

(75) Inventors: Sri Mohana Satya Srinivas Singamsetty, Cupertino, CA (US); Ping Pan, San Jose, CA (US); Biao Lu, Saratoga, CA (US); Rajan Rao, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 49 days.

(21) Appl. No.: 13/232,884

(22) Filed: Sep. 14, 2011

(65) Prior Publication Data

US 2012/0281529 A1     Nov. 8, 2012

Related U.S. Application Data

(60) Provisional application No. 61/483,279, filed on May 6, 2011.

(51) Int. Cl.
| | |
|---|---|
| H04L 12/26 | (2006.01) |
| H04L 12/725 | (2013.01) |
| H04L 12/707 | (2013.01) |
| H04L 12/927 | (2013.01) |
| H04L 12/913 | (2013.01) |
| H04L 12/24 | (2006.01) |

(52) U.S. Cl.
CPC .......... H04L 41/0896 (2013.01); H04L 45/302 (2013.01); H04L 47/805 (2013.01); *H04L 47/724* (2013.01); H04L 45/22 (2013.01); *H04L 41/0663* (2013.01)
USPC ...................................................... 370/230

(58) Field of Classification Search
USPC ......... 370/216–229, 252, 254, 395.1, 395.21, 370/395.5–395.52, 400–401, 907
See application file for complete search history.

(56) References Cited

U.S. PATENT DOCUMENTS

| | | | | |
|---|---|---|---|---|
| 7,248,561 B2 * | 7/2007 | Ishibashi et al. | ............... | 370/228 |
| 7,301,911 B2 * | 11/2007 | Mack-Crane et al. | ........ | 370/254 |
| 7,457,240 B2 * | 11/2008 | Oki et al. | ...................... | 370/230 |
| 7,652,983 B1 * | 1/2010 | Li et al. | .......................... | 370/217 |
| 7,957,284 B2 * | 6/2011 | Lu et al. | ......................... | 370/230 |
| 7,990,856 B2 * | 8/2011 | Kotrla et al. | .................. | 370/229 |
| 8,107,379 B2 * | 1/2012 | Vasseur | ......................... | 370/238 |
| 2011/0305136 A1 * | 12/2011 | Pan et al. | ...................... | 370/218 |
| 2012/0082455 A1 * | 4/2012 | Bardalai et al. | ................. | 398/58 |

OTHER PUBLICATIONS

Ceccarelli et al, Traffic Engineering Extensions to OSPF for Generalized MPLS (GMPLS) Control of Evolving G.709 OTN Networks, Internet-Draft, 19 pages, 2011.*
Choi et al, Priority-Based Optical Network Protection and Restoration With Application to DOD Networks, IEEE, 6 pages, 2003.*

* cited by examiner

*Primary Examiner* — Frank Duong
(74) *Attorney, Agent, or Firm* — Dunlap Codding LLC; David L. Soltz (57) ABSTRACT

Methods and nodes are disclosed. In the methods, circuitry of a first node generates a link state advertising message including bandwidth information indicative of unreserved aggregate bandwidth for multiple priority connections where aggregate bandwidth is greater than available bandwidth. The link state advertising message is transmitted from the first node to a plurality of second nodes within a mesh network. Node bandwidth constraints may be established that contain some designated allocated bandwidth which is not shared with any other Class Types (CT); however, the bandwidth constraints may also allow segregation of other CTs so that within those CTs allocation of designated bandwidth is guaranteed for high priority traffic and low priority traffic is left with the remaining bandwidth in the CT's allocation.

21 Claims, 9 Drawing Sheets

Actual bandwidth = BW_p

Aggregated bandwidth = N x BW_p (this applies to both BW_p_high and BW_p_low)

0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |           Type (1)            |            Length             |
   +-+-+-+-+-+-+-+-+-+-+-+-+-+-+-+-+-+-+-+-+-+-+-+-+-+-+-+-+-+-+-+-+
   //                             Misc.                           //
   +-+-+-+-+-+-+-+-+-+-+-+-+-+-+-+-+-+-+-+-+-+-+-+-+-+-+-+-+-+-+-+-+
   | Available Bandwidth at Prio 0 | Available Bandwidth at Prio 1 |
   +-+-+-+-+-+-+-+-+-+-+-+-+-+-+-+-+-+-+-+-+-+-+-+-+-+-+-+-+-+-+-+-+
   | Available Bandwidth at Prio 2 | Available Bandwidth at Prio 3 |
   +-+-+-+-+-+-+-+-+-+-+-+-+-+-+-+-+-+-+-+-+-+-+-+-+-+-+-+-+-+-+-+-+
   | Available Bandwidth at Prio 4 | Available Bandwidth at Prio 5 |
   +-+-+-+-+-+-+-+-+-+-+-+-+-+-+-+-+-+-+-+-+-+-+-+-+-+-+-+-+-+-+-+-+
   | Available Bandwidth at Prio 6 | Available Bandwidth at Prio 7 |
   +-+-+-+-+-+-+-+-+-+-+-+-+-+-+-+-+-+-+-+-+-+-+-+-+-+-+-+-+-+-+-+-+
```

0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |           Type (1)            |            Length             |
   +-+-+-+-+-+-+-+-+-+-+-+-+-+-+-+-+-+-+-+-+-+-+-+-+-+-+-+-+-+-+-+-+
   //                             Misc.                           //
   +-+-+-+-+-+-+-+-+-+-+-+-+-+-+-+-+-+-+-+-+-+-+-+-+-+-+-+-+-+-+-+-+
   | Available Bandwidth at Prio 0 | Available Bandwidth at Prio 1 |
   +-+-+-+-+-+-+-+-+-+-+-+-+-+-+-+-+-+-+-+-+-+-+-+-+-+-+-+-+-+-+-+-+
   | Available Bandwidth at Prio 2 |      BW_w (at Prio 3)         |—— 612
   +-+-+-+-+-+-+-+-+-+-+-+-+-+-+-+-+-+-+-+-+-+-+-+-+-+-+-+-+-+-+-+-+
614 ——|    BW_p_high (at Prio 4)   |     BW_p_low (at Prio 5)      |—— 616
   +-+-+-+-+-+-+-+-+-+-+-+-+-+-+-+-+-+-+-+-+-+-+-+-+-+-+-+-+-+-+-+-+
   | Available Bandwidth at Prio 6 | Available Bandwidth at Prio 7 |
   +-+-+-+-+-+-+-+-+-+-+-+-+-+-+-+-+-+-+-+-+-+-+-+-+-+-+-+-+-+-+-+-+
```

Fig. 11

BANDWIDTH ADVERTISEMENT MODEL FOR SHARED MESH PROTECTION

CROSS-REFERENCE TO RELATED APPLICATIONS

The present patent application claims priority to the provisional patent application identified by U.S. Ser. No. 61/483,279 titled "Bandwidth Advertisement Model for Shared Mesh Protection" filed on May 6, 2011, the entire content of which is hereby incorporated herein by reference.

FIELD OF THE DISCLOSURE

The disclosure generally relates to methods and apparatuses that facilitate the routing of services at various rates or signal types through optical channel data unit (ODU) switched optical transport networks (OTN). More particularly the disclosure relates to bandwidth modeling and advertising with enhanced utilization of bandwidth for OTU/ODU interfaces by distributing bandwidth information regarding the availability of bandwidth for different types of optical channel data unit label switched paths, such as working connections, high-priority protecting connections, and low-priority protecting connections. The bandwidth information can be saved in a link state database and used for computing routes or paths in the optical transport network for setting up optical channel data unit label switched paths in networks having multiple nodes communicating via communication links. Though the methodologies set forth herein are in the context of GMPLS based traffic engineering (TE) routing for OTN networks, such methodologies may be applied to any interface/network that supports different types of label switched paths.

BACKGROUND

Traffic Engineering (TE) is a technology that is concerned with performance optimization of operational networks. In general, Traffic Engineering includes a set of applications mechanisms, tools, and scientific principles that allow for measuring, modeling, characterizing and control of user data traffic in order to achieve specific performance objectives.

Multiprotocol label switching (MPLS) is a scheme in a high-performance telecommunication network which directs and carries data from one node to the next node in the network. In MPLS, labels are assigned to data packets. Packet forwarding decisions from one node to the next node in the network are made based on the contents of the label for each data packet, without the need to examine the data packet itself.

Generalized Multiprotocol Label Switching (GMPLS) is a type of protocol which extends multiprotocol label switching to encompass network schemes based upon time-division multiplexing (e.g. SONET/SDH, PDH, G.709), wavelength multiplexing, and spatial switching (e.g. incoming port or fiber to outgoing port or fiber). Multiplexing, such as time-division multiplexing is when two or more signals or bit streams are transferred over a common channel. In particular, time-division multiplexing (TDM) is a type of digital multiplexing in which two or more signals or bit streams are transferred as sub-channels in one communication channel, but are physically taking turns on the communication channel. The time domain is divided into several recurrent timeslots of fixed length, one for each sub-channel. After the last sub-channel, the cycle starts over again. Time-division multiplexing is commonly used for circuit mode communication with a fixed number of channels and constant bandwidth per channel. Time-division multiplexing differs from statistical multiplexing, such as packet switching, in that the timeslots are returned in a fixed order and preallocated to the channels, rather than scheduled on a packet by packet basis.

Bandwidth is the data transfer capacity of a link or connection, which may be expressed in optical data units, bits per second, number of time slots, or expressed by other methods.

Generalized Multiprotocol Label Switching includes multiple types of optical channel data unit label switched paths including protection and recovery mechanisms which specifies predefined (1) working connections within a shared mesh network having multiple nodes and communication links for transmitting data between a headend node and a tailend node; and (2) protecting connections specifying a different group of nodes and/or communication links for transmitting data between the headend node to the tailend node in the event that one or more of the working connections fail. A first node of a path is referred to as a headend node. A last node of a path is referred to as a tailend node. Data is initially transmitted over the optical channel data unit label switched path, referred to as the working connection, and then, when a working connection fails, the headend node or tailend node activates one of the protecting connections for redirecting data within the shared mesh network.

The protecting connections may be defined as high-priority protecting connections or low-priority protecting connections. The headend node directs data to the working connection and may also have a high-priority protecting connection and a low-priority protecting connection. The headend node may create high-priority protecting connections and/or low-priority protecting connections in an effort to protect a particular working connection. For a particular headend node-tailend node pair, a set of intermediate nodes and/or communication links that is designated for high-priority protecting connections is preferably a complement of the set of intermediate nodes and/or communication links designated for the working connection. This means that none of the intermediate nodes and/or communication links in a set designated for high-priority protecting connection is shared with the working connection the high-priority protecting connection protects. This increases the likelihood that a high-priority protecting connection will not fail at the same time as the working connection the high-priority protecting connection is protecting.

In contrast, a set of intermediate nodes and/or communication links that are designated for low-priority protecting connections may be shared with the working connection, or low-priority protecting connections, as long as the set of intermediate nodes and/or communication links designated for a low-priority protecting connection is not identical to the set of intermediate nodes and/or communication links designated for the working connection the low-priority protecting connection is protecting.

In addition, a low-priority protecting connection may be preempted by a high-priority protecting connection. For example, in some configurations, a high-priority connection is always allocated bandwidth while a low-priority protecting connection is only allocated bandwidth if the bandwidth is not needed by a high-priority connection.

Two current methodologies for bandwidth reservation and management detailing constraints and availability for MPLS DiffServ-Aware Traffic Engineering (DS-TE) are the Maximum Allocation Model (MAM) and the Russian Doll Model (RDM). Bandwidth constraints (BC) define the rules that a node uses to allocate bandwidth to different Class Types.

In the MAM method, each Class Type (CT) has a designated allocated bandwidth which is not shared with any other CT. There is a one-to-one relationship between the CTs and the BCs. A CT cannot make use of the bandwidth left unused by another CT. Further, preemption is not required to provide bandwidth guarantees per CT. For example, the MAM methodology may divide the total bandwidth for a link into 30% for working connections and 70% for protecting connections. Within the bandwidth allocated for working connections, 70% may be allocated for a first Class Type (CT0) and 30% may be allocated for a second Class Type (CT1), with no sharing among the CTs, even of unused bandwidth. The MAM method is more fully described in reference RFC4125.

The RDM method allows a maximum number of bandwidth constraints equal to the maximum number of types of Class Type (CT). Take for example, a situation with three Class Types—CT0, CT1, and CT2—where CT0 has the lowest priority, CT1 more, and CT2 the most, and where the bandwidth constraints are 100% (CT2+CT1+CT0), 70% (CT2+CT1), and 30% (CT2). In this example, using the RDM model, the CT0 could use 100% of the bandwidth capacity if no CT1 or CT2 traffic were present on that link. If CT1 traffic is present, CT1 would be able to occupy 70% and CT0 would be reduced to 30%. If CT2 traffic were also present, then CT2 traffic would be able to use 30% by itself, CT1 traffic would be reduced to 40% of the link bandwidth, and CT0 traffic would remain at 30% of the link bandwidth. In the RDM method, high priority traffic always is allocated its designated portion of the bandwidth and low priority traffic is left with the remaining bandwidth in its allocation. The RDM model is more fully described in reference RFC4127.

However, the methodologies for bandwidth allocation are lacking in several aspects. The prior art models currently give a choice of complete segregation of CTs without sharing resources, as in the MAM method, or of complete preemption where a high priority CT always is allocated bandwidth, as in the RDM method. These methods limit effective Traffic Engineering by under-utilizing bandwidth resources, especially by under-utilizing resources available for protecting connections because of a low probability that any particular protecting connection will be activated.

Another limitation of the current models is the current method of bandwidth availability advertising, in which the nodes advertise only the cumulative unreserved bandwidth for a CT. Therefore, low-priority protecting connections are advertised as reserving bandwidth, when there is a low probability that the bandwidth will actually be used.

SUMMARY

A method and node are disclosed. The problem of underutilization of shared mesh network resources is addressed through bandwidth advertisement of aggregate protecting connection bandwidth availability based on an over-subscription factor (N), as well as through advertisement individually of both aggregate high-priority protecting connection bandwidth availability and aggregate low-priority protecting connection bandwidth availability. This can be accomplished by establishing multiple levels of bandwidth constraints for Traffic Engineering so that working connections do not share bandwidth but protecting connections can share a risk or preemption and such information may be advertised in a Max Shared Protection Bandwidth sub TLV in an Advertising Message between Control Planes of nodes.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

The mechanisms proposed in this disclosure circumvent the problems described above. The present disclosure describes a system utilizing network nodes and link bandwidths in a manner that preferably advertises aggregate available bandwidth. Aggregated bandwidth may be based on the number of users that can share the same unit of bandwidth (known as the over-subscription factor "N") and the total reserved available bandwidth, such that the aggregated bandwidth exceeds the available bandwidth. Control planes of the nodes advertise multiple priority connections' bandwidth, both as individual bandwidths and as an aggregate bandwidth. The exemplary embodiment advertises both high and low priority protecting connection bandwidth as well as aggregate protecting connection bandwidth, though the concepts of the current disclosure may be applied to any number of priority connections.

Node bandwidth constraints may be established that contain some designated allocated bandwidth which is not shared with any other Class Types (CT); however, the bandwidth constraints may also allow segregation of other CTs so that within those CTs allocation of designated bandwidth is guaranteed for high priority traffic and low priority traffic is left with the remaining bandwidth in the CT's allocation.

DEFINITIONS

If used throughout the description and the drawings, the following short terms have the following meanings unless otherwise stated:

CT stands for Class Type. A Class Type is the set of Traffic Trunks crossing a link that is governed by a specific set of bandwidth constraints. CT is used for the purposes of link bandwidth allocation, constraint-based routing and admission control. A given Traffic Trunk belongs to the same CT on all links.

A Traffic Trunk is an aggregation of traffic flows of a same class (i.e., treated equivalently from the DS-TE perspective), which is placed inside a TE LSP.

DCC stands for Dedicated Data Communication Channels.

DS stands for DiffServ-Aware. By mapping the traffic from a given Differentiated Services (DiffServ) class of service on a separate MPLS Labeled Switched Path, DiffServ-Aware MPLS networks can meet engineering constraints which are specific to the given class on both a shortest and non-shortest path.

GCC stands for General Communication Channel which is an in-band side channel used to carry transmission management and signaling information within Optical Transport Network elements.

GMPLS stands for Generalized Multi-Protocol Label Switching which extends Multi-Protocol Label Switching to encompass time-division (for example, SONET/SDH, PDH, G.709), wavelength (lambdas), and spatial multiplexing (e.g., incoming port or fiber to outgoing port or fiber). The GMPLS framework includes a set of routing protocols which runs on a control module. The Generalized Multiprotocol Label Switching architecture is defined, for example in RFC 3945.

IETF stands for Internet Engineering Task Force.

IP stands for Internet Protocol which is a protocol used for communicating data across a packet-switched internetwork using the Internet Protocol Suite, also referred to as TCP/IP.

LSP stands for Label Switched Path which is a path through a Generalized Multi-Protocol Label Switching network. Note that Label Switched Paths can be bidirectional or unidirectional; they enable packets to be label switched through the Multiprotocol Label Switched network from a port on an ingress node (which can be called a headend node) to a port on an egress node (which can be called a tailend node).

MPLS stands for multi-protocol label switching which is a scheme in telecommunications networks for carrying data from one node to the next node. MPLS operates at an OSI model layer that is generally considered to lie between traditional definitions of layer 2 (data link layer) and layer 3 (network layer) and is thus often referred to as a layer 2.5 protocol.

OSC stands for Optical Supervisory Channel which is an additional wavelength that normally carries network management information within an optical network.

OTN stands for Optical Transport Network which includes a set of optical switch nodes which are connected by optical fiber links. ITU-T recommendations G.709 and G.872 define OTN interface requirements and network architecture respectively.

SONET/SDH stands for Synchronous Optical Networking/Synchronous Digital Hierarchy which are standardized multiplexer protocols that transfer multiple digital bit streams over optical fiber using lasers or light emitting diodes.

TE stands for Traffic Engineering which is a technology that is concerned with performance optimization of operational networks. In general, TE includes a set of applications mechanisms, tools, and scientific principles that allow for measuring, modeling, characterizing and control of user data traffic in order to achieve specific performance objectives.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, the mechanisms defined in GMPLS for bandwidth constraint, advertising, and utilization have overlooked a number of issues. In particular, the conventional mechanisms defined in GMPLS bandwidth constraint modeling limit bandwidth constraints to a CT. The present disclosure addresses these deficiencies with a methodology for a shared mesh network to more fully utilize available bandwidth for working, high-priority protecting connections, and low-priority protecting connections, including advertising a total aggregate bandwidth unreserved, as well as individual type bandwidth unreserved, preferably for each signal type.

Figure 1:
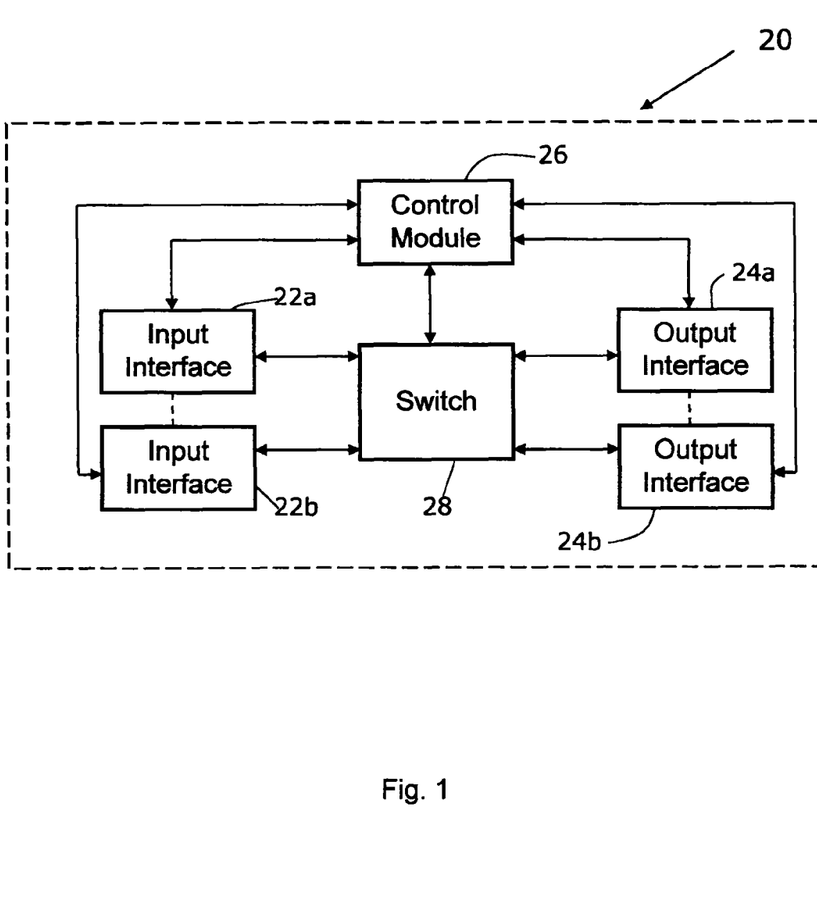
FIG. 1 is an exemplary switch node constructed in accordance with the present disclosure.
Figure 2:
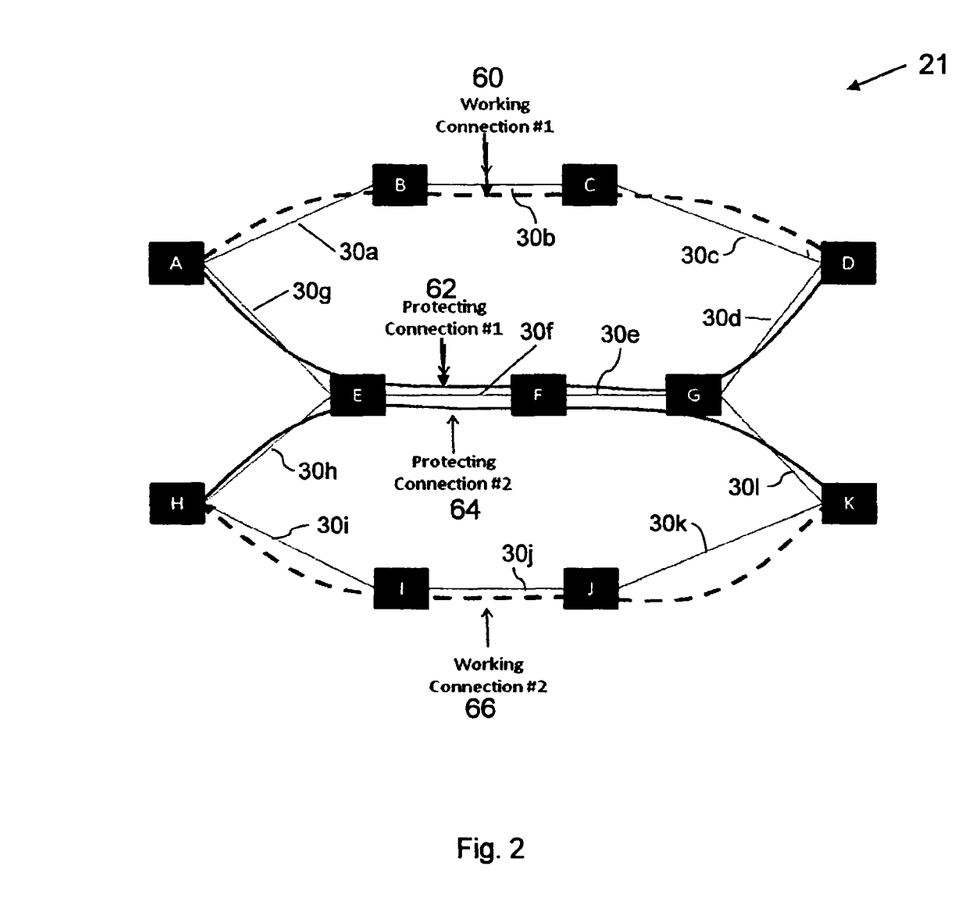
FIG. 2 is a block diagram of an exemplary network constructed in accordance with the present disclosure.

Referring now to the drawings, and in particular to FIG. 1, shown therein and designated by reference numeral 20 is an exemplary node constructed in accordance with the present disclosure. As will be discussed in more detail below, the node 20 is adapted to facilitate the communication of data (which may be referred to herein as "traffic") between multiple nodes 20 in a mesh network 21 (as shown in FIG. 2 with the notations A-K). A Class Type (CT) may be defined as a type of traffic between the nodes 20. CTs may be assigned priorities. The nodes 20 and/or the operators preferable know which priorities correspond to the CTs. This may be accomplished by a separate message transmitted prior to transmittal of a link state advertising message using in-band or out-of-band techniques. Exemplary out-of-band techniques include messaging over external networks, facsimile, e-mail, or the like.

The node 20 is provided with one or more input interfaces 22, one or more output interfaces 24, a control module 26, and a switch 28.

In general, the input interfaces, shown here as 22a and 22b, are adapted to receive traffic from the mesh network 21, and the output interfaces, shown here as 24a and 24b, are adapted to transmit traffic onto the mesh network 21 (See FIG. 2). The switch 28 serves to communicate the traffic from the input interfaces 22a and 22b, to the output interfaces 24a and 24b. And, the control module 26 serves to control the operations of the input interfaces 22a and 22b, the output interfaces 24a and 24b, and the switch 28, as well as to set up label switched paths within the mesh network 21.

The node 20 can be implemented in a variety of ways, including, commercial installations having one or more backplanes (not shown), racks, and the like. In this example, the input interface(s) 22, the output interface(s) 24, the control module 26 and the switch 28 are typically implemented as separate devices, which may have their own power supply, local memory and processing equipment. In another example, the node 20 can be implemented as a single device having a shared power supply, memory and processing equipment. Or, in another example, the node 20 can be implemented in a modular manner in which one or more of the input interface(s) 22, the output interface(s) 24, the control module 26 and the switch 28 share a power supply and/or housing.

The input interface(s) 22, and the output interface(s) 24 of one node 20 are adapted to communicate with corresponding input interface(s) 22, and output interface(s) 24 of another node 20 within the mesh network 21 via communication links 30, which are shown for purposes of clarity as 30a-l (as shown in FIG. 2). An example of an input interface 22 and/or an output interface 24 is an Ethernet card or optical port. In general, each of the input interface(s) 22 and/or the output interface(s) 24 may have a unique logical identification, such as an IP address. The communication links 30a-l can be implemented in a variety of ways, such as a physical link including electrical (e.g., copper wire or coax) and/or optical signal (e.g., optical fiber or other waveguide) carrying capabilities, or as a wireless link.

The implementation of the input interface(s) 22, and the output interface(s) 24 will depend upon the particular type of communication link 30 that the particular input interface 22 and/or output interface 24 is designed to communicate with. For example, one of the input interfaces 22 can be designed to communicate wirelessly with another node 20 within the mesh network 21, while one of the output interfaces 24 of the node 20 can be designed to communicate optically through a fiber-optic link. For a particular node 20, the input interfaces 22a and 22b can be of the same type or different types; the output interfaces 24a and 24b can be of the same type or different types; and the input interface(s) 22 and output interface(s) 24 can be of the same type or different types.

The input interface 22 and the output interface 24 are shown separately for purposes of clarity. However, it should be understood that one or more of the input interfaces 22 and/or the output interfaces 24 could be connected to a single communication link 30 and implemented as a single device, such as a line module. Exemplary line modules are described in U.S. Patent Application Publication number 20090245289, the entire contents of which are hereby incorporated herein by reference.

Figure 3:
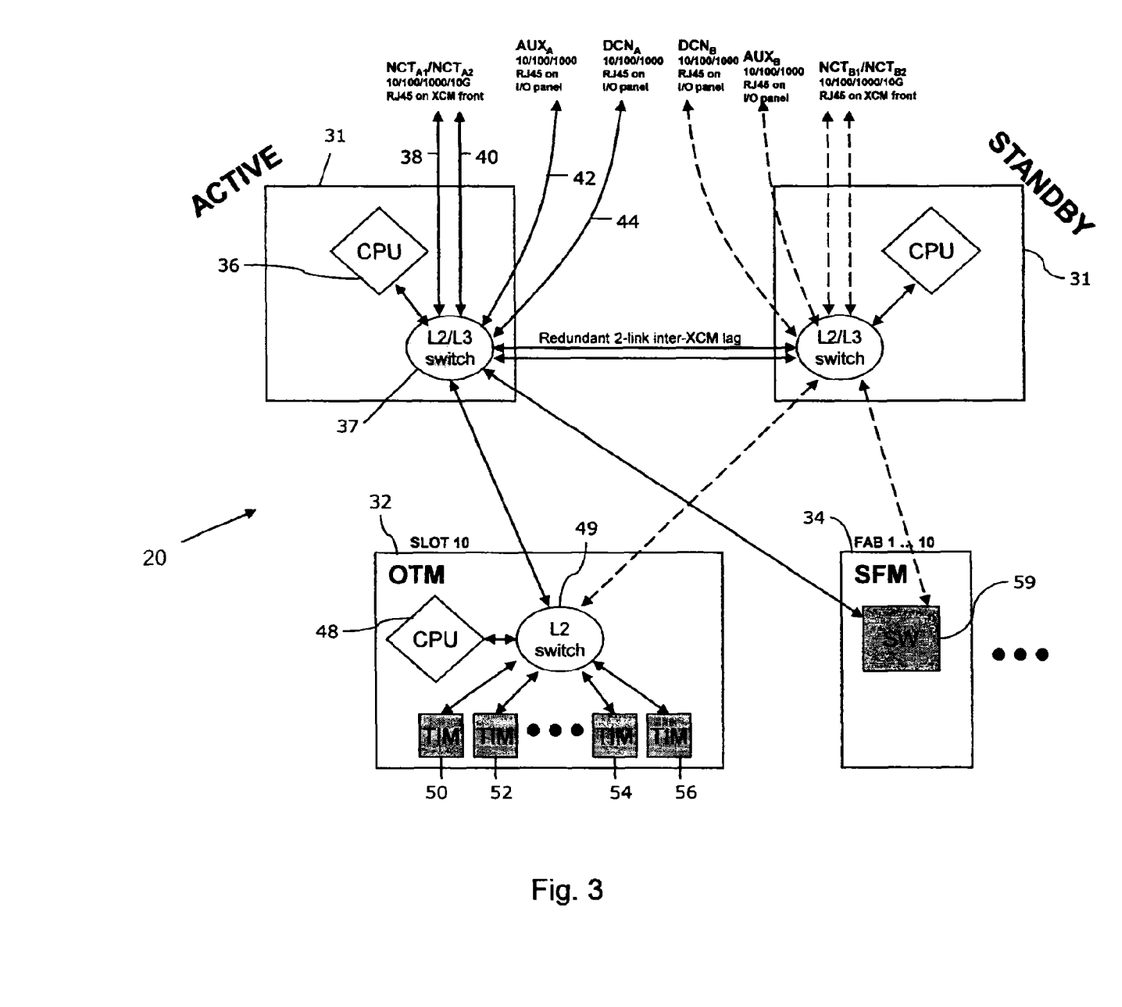
FIG. 3 is a block diagram of another version of a switch node constructed in accordance with the present disclosure.

FIG. 3 shows an example of node 20 having a modular construction. Node 20 is provided with one or more control modules 31, one or more optical tributary modules (OTM) 32, and one or more switch fabric modules 34. In the example depicted in FIG. 3, the node 20 is provided with at least two control modules 31, here designated as 31a and 31b, with at least one of the control modules 31a and 31b being actively used, and the other one of the control modules 31a and 31b being available as a backup in the event the actively used control module 31a or 31b fails or is taken off-line. In general, the control modules 31a and 31b are particular implementations of the control module 26 depicted in FIG. 1; the optical tributary module 32 is a particular implementation of the input interfaces 22 and the output interfaces 24; and the switch fabric module 34 is a particular implementation of the switch 28.

In general, the control modules 31a and 31b are provided with one or more processors 36, in FIG. 3, one processor 36 is shown by way of example as a Central Processing Unit (CPU). However, it should be understood that the processor(s) 36 can be implemented in other ways such as field programmable gate array(s) (FPGA), digital signal processor(s), or the like. The control modules 31a and 31b are also provided with a L2/L3 switch 37 (i.e. Layer 2/Layer 3 switch).

The optical tributary module 32 is provided with one or more processors 48; one or more L2 switches 49; and one or more transport interface modules 50, 52, 54, and 56 communicating with the L2 switch 49 (i.e., Layer 2 switch). The L2 switch 49 also communicates with the control plane L2/L3 switch 37 for communicating control messages between the optical tributary module 32 and the control module(s) 31. The one or more processors 48 is shown by way of example as a CPU; however, it should be understood that the one or more processors 48 can be implemented in other ways such as a field programmable gate array(s) (FPGA), digital signal processor(s), or the like. Certain ones of the transport interface modules 50, 52, 54 and 56 may form input interfaces, and other ones of the transport interface modules 50, 52, 54 and 56 may form output interfaces. For example, the transport interface modules 50 and 52 can constitute input interfaces, and the transport interface modules 54 and 56 can constitute output interfaces.

It should be understood that the nodes 20 can be implemented in a variety of ways including those shown and discussed in U.S. Patent Application Number 20090245289 entitled "Programmable Time Division Multiplexed Switching" the entire content of which is hereby incorporated herein by reference.

Returning to FIG. 2, mesh network 21 includes multiple nodes 20 which are labeled as A-K. The mesh network 21 can include more than eleven nodes, but eleven are shown for purposes of clarity. In particular, the nodes A, B, C and D are configured to communicate via a first optical channel data unit label switched path 60 along the communication links 30a, 30b, and 30c; while the nodes A, E, F, G and D are also configured to communicate via a second optical channel data unit label switched path 62 via the communication links 30d-g. The first optical channel data unit label switched path 60 may be a working connection (and is referred to hereinafter as the working connection 60), and the second optical channel data unit label switched path 62 may be a protecting connection (and is referred to hereinafter as the protecting connection 62). The protecting connection 62 may be a high-priority protecting connection 62a or a low-priority protecting connection 62b.

Any two or more of the nodes A-K may connect via multiple communication links 30, which can be optical links. For bidirectional communication, for example, an optical link or fiber may be dedicated for data traffic transmitted in one direction (or both directions), another optical link may be dedicated for data traffic transmitted in the opposite direction, and yet another optical link may be used in case of a failure of the connection. In practice, there may be N working connections and M protecting connections between any two of the nodes A-K, where M<N.

More particularly, FIG. 2 shows an exemplary operation environment for a bandwidth modeling protocol stored on one or more non-transitory computer readable medium and executed by one or more processors 36 of the control module 26 and/or control module 31 of each of the nodes A-K. Exemplary non-transitory computer readable mediums may include read-only memory, random access memory, an EEPROM, a hard disk, solid-state drive, flash memory, an optical disk, combinations thereof or the like. A data structure may be a table in a stored memory.

Figure 4:
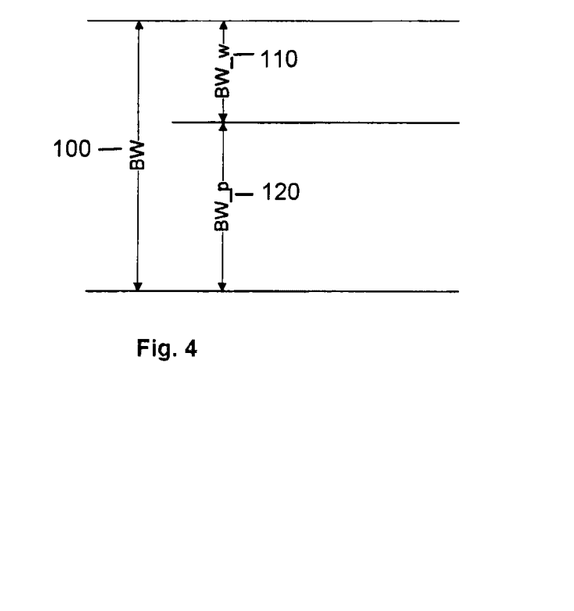
FIG. 4 is an illustration of an allocation of bandwidth into total bandwidth reserved for working connections and total bandwidth reserved for high and low priority protecting connections.

Referring now to FIG. 4, shown therein is an illustration of the allocation of total link bandwidth 100 for an exemplary communication link 30 into total working connections reserved bandwidth BW_w 110 and total protecting connections reserved bandwidth BW_p 120. Total protecting connections reserved available bandwidth 120, also known as a bandwidth pool for the protecting connections, can be shared by high-priority protecting connections 62a and low-priority protecting connections 62b. High-priority protecting connections 62a may be able to preempt low-priority protecting connections 62b for use of total protecting connections reserved available bandwidth 120. The amount of aggregate bandwidth available for high-priority protecting connections is designated as BW_p_high and the amount of aggregate bandwidth available for low-priority protecting connections is designated as BW_p_low.

Figure 5:
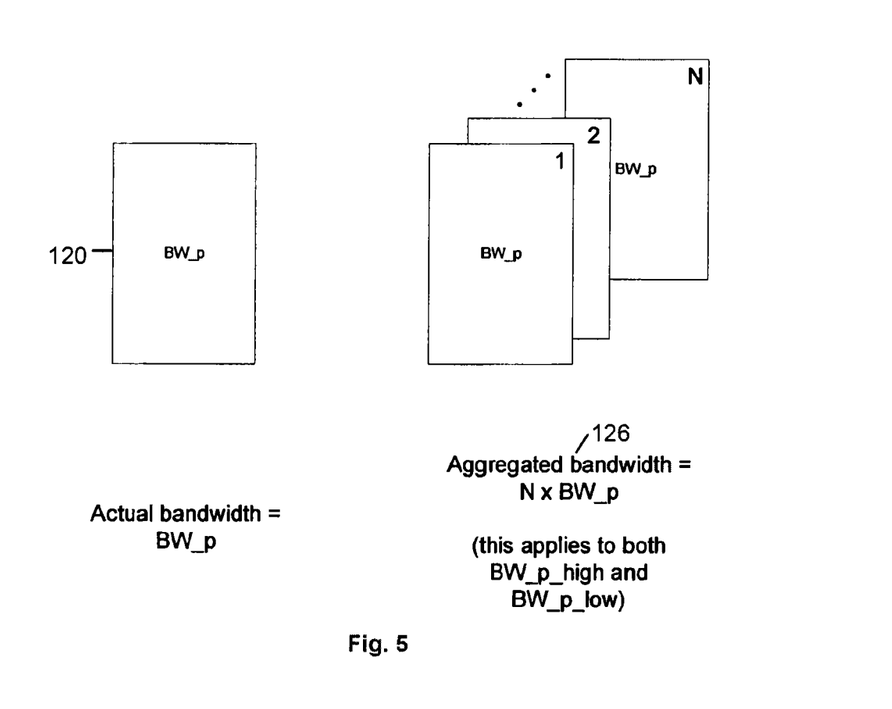
FIG. 5 is an illustration of aggregated bandwidth in a shared mesh protection environment where N is an over-subscription factor.

FIG. 5 illustrates aggregated total protecting connections reserved bandwidth in a shared mesh protection environment. Protecting connections aggregated bandwidth 126 can be based on the number of users that can share the same unit of bandwidth (known as the over-subscription factor "N") and the total protecting connections reserved available bandwidth 120, such that the aggregated bandwidth 126 exceeds the available bandwidth 120.

Figure 6:
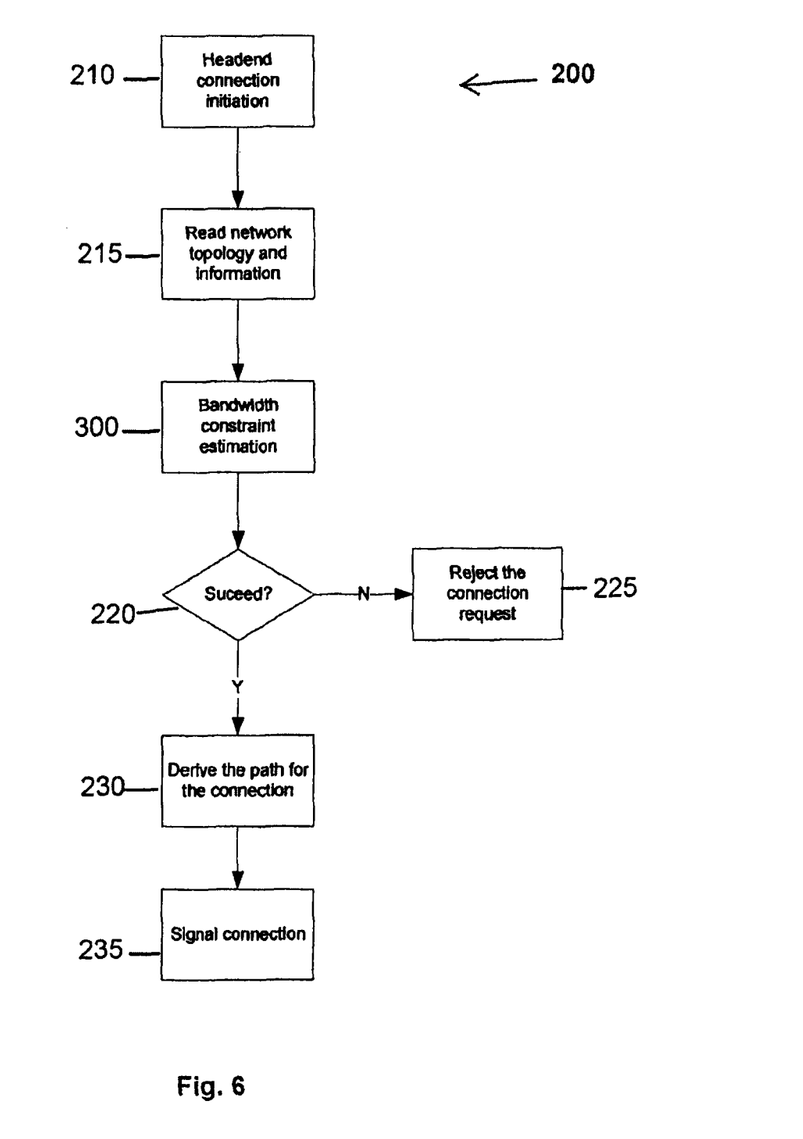
FIG. 6 is a flowchart of a node sequence logic for Headend Processing to set u either a working or protecting connection.

The first node in the path is known as the headend node, and is illustrated by node 20-A in FIG. 2. FIG. 6 is a flowchart showing an exemplary Connection Setup Logic 200 sequence executed by the node 20-A for setting up a working connection 60, a high-priority protecting connection 62a, or a low-priority protecting connection 62b. The process of FIG. 6 may be performed by one or more components within the node 20-A.

The Connection Setup Logic 200 begins with step 210 when a connection is requested and node 20-A initiates an optical channel data unit label switched path, such as a working connection 60 or protecting connection 62. Next, in step 215, the node 20-A reads the network topology and information from one or more databases such as a Traffic Engineering Database, which is well known in the art. The process then moves to step 300, Bandwidth Constraint Estimation, which will be illustrated in the discussion of FIGS. 7 and 8. At the decision step 220, the process checks to see if the Bandwidth Constraint Estimation 300 succeeds. If the Bandwidth Constraint Estimation 300 does not succeed, the connection request is rejected in step 225. Alternatively, if the Bandwidth Constraint Estimation 300 does succeed, the Connection Setup Logic 200 moves to step 230 in which the node 20-A derives the path for the requested connection, and then, in step 235, the node 20-A signals the requested connection.

Figure 7:
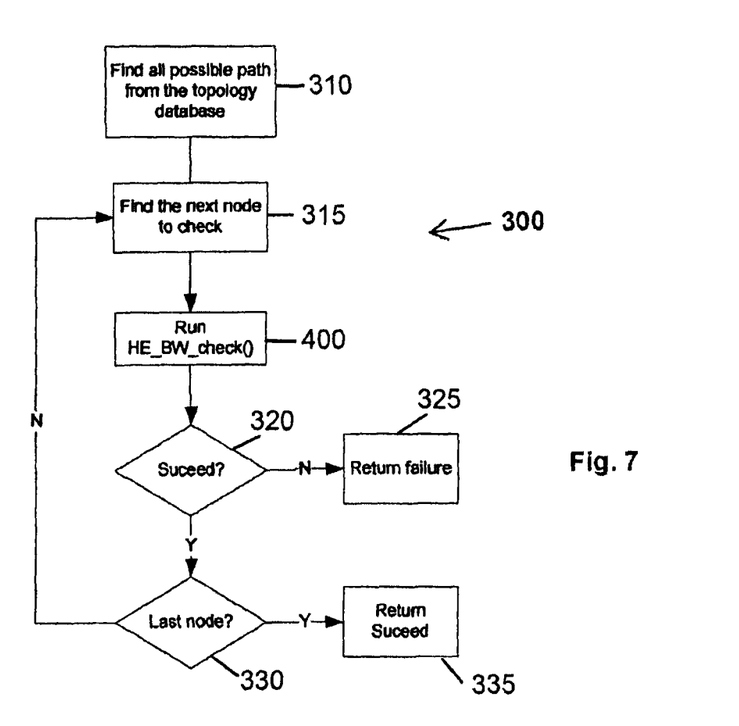
FIG. 7 is a flowchart of a Headend Bandwidth Constraint Estimation step sequence logic illustrated in FIG. 6.

FIG. 7 is a flowchart illustrating step 300 in FIG. 6, the Bandwidth Constraint Estimation 300. In a first step 310 of this sequence, the node 20-A (i.e., headend node) finds possible paths for the requested connection from a topology database 130. The sequence then moves to step 315 in which the node 20-A finds the next node (for example, 20-B or 20-E (e.g. intermediate nodes) as illustrated in FIG. 2) to check in the path (for example, path A-B-C-D or A-E-F-G-D in FIG. 2). The sequence then moves to run Headend Bandwidth Check 400 on the next node identified. Exemplary processing logic for the Headend Bandwidth Check 400 is described in the discussion of FIG. 8. The Headend Bandwidth Check 400 results in a decision step 320, if the result is the Headend Bandwidth Check 400 did not succeed, then a failure message is returned from step 325 to step 220 in the Connection Setup Logic 300 sequence illustrated in FIG. 6. Upon failure, the sequence logic may be repeated for other possible paths found in the topology database 130.

If the result of the Headend Bandwidth Check 400 is successful, then the system checks in a step 330 if the next node 20 to check is a last node (for example, node 20-D (e.g., tailend node) in the path A-B-C-D, as illustrated in FIG. 2). If the result of step 330 is the node 20 is not the last node, then the sequence moves back to step 315 to find the next node 20 to check and repeats the sequence. If the result of step 330 is the node 20 is the last node, then the sequence moves to a step 335 and returns a success message from step 335 to step 220 in the Connection Setup Logic 300 sequence illustrated in FIG. 6.

Figure 8:
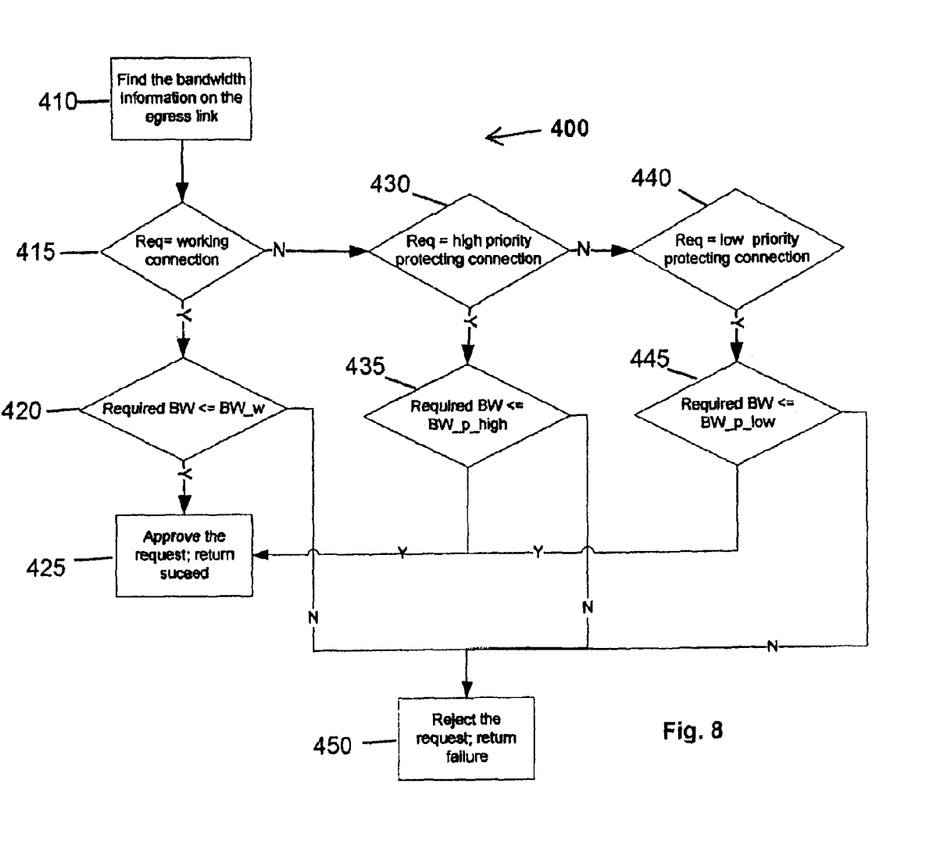
FIG. 8 is a flowchart of a Headend Estimation Bandwidth Check step sequence logic illustrated in a step labeled Run HE_BW_Check( ) of FIG. 7.

FIG. 8 is a flowchart of the Headend Estimation Bandwidth Check 400 exemplary processing sequence illustrated in FIG. 7 block 400. The Headend Estimation Bandwidth Check 400 process begins with the node being checked (for example node 20-B (e.g. intermediate node) as illustrated in FIG. 2) finding the bandwidth information on the egress link.

The next step in the process may be a decision step 415 in which the sequence determines if the requested connection is a working connection such as working connection 60 in FIG. 2. If the requested connection is a working connection 60, the sequence may continue to a decision step 420 in which the sequence determines if the required bandwidth for the requested working connection 60 is less than or equal to a total working connections reserved bandwidth BW_w 110. If the required bandwidth for the requested working connection 60 is less than or equal to a total working connections reserved bandwidth BW_w 110, then the process proceeds to a step 425 in which the process approves the requested connection and returns a succeed message to step 320 of the Headend Bandwidth Estimation 300. If the required bandwidth for the requested working connection 60 is greater than a total working connections reserved bandwidth BW_w 110, then the process proceeds to a step 450, the requested connection is rejected and a return failure message is returned to step 320 of the Headend Bandwidth Estimation 300.

Alternatively, if the decision step 415 determines that the requested connection is not a working connection 60, then the process checks in a step 430 if the requested connection is a high-priority protecting connection 62a. If the requested connection is a high-priority protecting connection 62a, then the process proceeds to a decision step 435 to check if the required bandwidth for the requested high-priority protecting connection is less than or equal to a total protecting connections reserved bandwidth BW_p 120. If the answer is yes, then the process may proceed to a step 425 in which the process approves the requested connection and returns a succeed message to step 320 of the Headend Bandwidth Estimation 300. If the answer is no, then the process proceeds to a step 450, the requested connection is rejected and a return failure message is returned to step 320 of the Headend Bandwidth Estimation 300.

Alternatively, if the decision step 430 determines that the requested connection is not a high-priority protecting connection 62a, then the process moves to a step 440 to determine if the requested connection is a low-priority protecting connection 62b. If the requested connection is a low-priority protecting connection 62b, the process may proceed to a step 445 to check if the required bandwidth for the requested low-priority protecting connection 62b is less than or equal to the total protecting connections reserved bandwidth BW_p 120. If the required bandwidth for the requested low-priority protecting connection 62b is less than or equal to the total protecting connections reserved bandwidth BW_p 120, then the process may proceed to step 425 in which the process approves the requested connection and returns a succeed message to step 320 of the Headend Bandwidth Estimation 300. If the required bandwidth for the requested low-priority protecting connection 62b is greater than the total protecting connections reserved bandwidth BW_p 120, then the process may proceed to step 450, the requested connection is rejected and the return failure message is returned to step 320 of the Headend Bandwidth Estimation 300.

Figure 9:
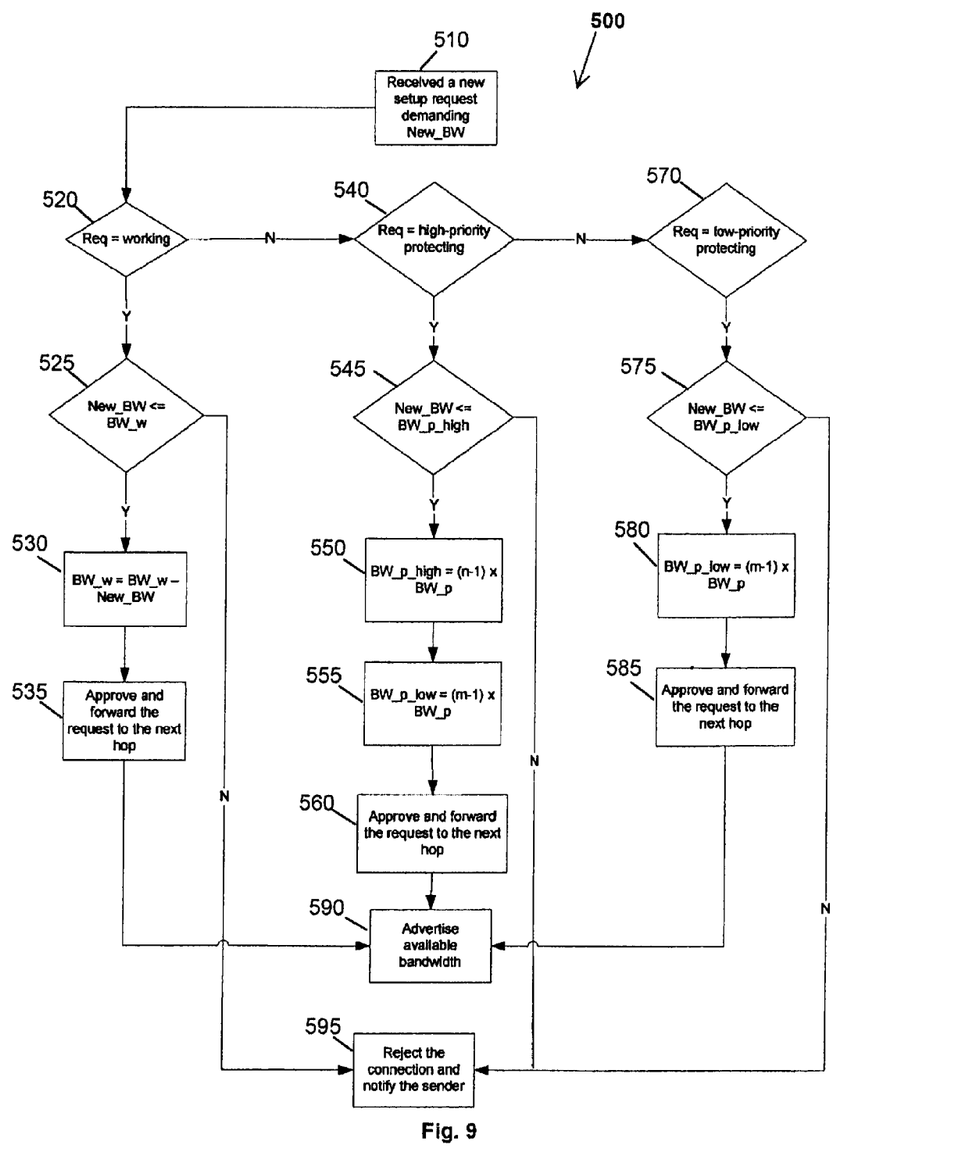
FIG. 9 is a flowchart of a node sequence logic for an intermediate node receiving a connection setup request, checking bandwidth availability for the specific type of request and returning an advertising message of bandwidth availability, or a message of rejection, of the connection to the sender.

FIG. 9 is a flowchart of an Intermediate Node Bandwidth Advertisement with Shared Bandwidth for Low-priority Protecting Connections logic sequence 500. Intermediate nodes 502 are illustrated in FIG. 2, where nodes B, C, E, F, G, I, and J all exemplify intermediate nodes 502 in label switched path connections. In a first step 510 of the sequence 500, an intermediate node 502 receives a connection request containing an amount of required unreserved bandwidth for the requested connection. Next, the intermediate node 502 determines in a step 520 if the request is for a working connection 60 (as exemplified in FIG. 2).

If the request is for a working connection 60, then the intermediate node 502 compares the amount of required unreserved bandwidth in the connection request to an available bandwidth for all working connections on the intermediate node 502. If the requested working connection 60 required bandwidth is less than or equal to the available bandwidth for all working connections BW_w 110 on the intermediate node 502, then the request will be approved and the request will be forwarded to the next node 20, which may be one of the intermediate nodes 502, as shown in sequence step 535. Additionally, in a step 530, the intermediate node 502 recalculates the available bandwidth for working connections by subtracting the requested working connection required bandwidth from the total available bandwidth for working connections BW_w 110. This newly recalculated unreserved bandwidth available for use by working connections 60 is then advertised in a step 590 in a link state advertising message transmitted to the other nodes 20 in the mesh network 21.

If the decision step 520 determines that the request is not for a working connection 60, then, in a step 540, the intermediate node 502 determines if the requested connection is a high-priority protecting connection 62a. If the requested connection is a high-priority protecting connection 62a, then the sequence moves to a step 545 and compares the amount of required unreserved bandwidth in the connection request to high-priority protecting connections available aggregate bandwidth 122 on the intermediate node 502. If the requested high-priority protecting connections 62a required bandwidth is less than or equal to the high-priority protecting connections available aggregate bandwidth 122 on the intermediate node 502, then the request will be approved and the request will be forwarded to the next node 20, as shown in sequence step 560.

Additionally, in a step 550, the intermediate node 502 recalculates the available bandwidth that can be shared for high-priority protecting connections 62a. This calculation uses the aggregate available bandwidth for protecting connections 126. A first step in recalculation of the available bandwidth is step 550, here the recalculated available bandwidth is equal to the bandwidth pool reserved for all protecting connections multiplied by the difference of (the number of users that can share the same unit of bandwidth, i.e. the over-subscription factor "N") and (the number of high-priority connections using this bandwidth unit already, including the newly requested connection). However, the aggregate available bandwidth for protecting connections 126 also includes a deduction of the available bandwidth for low-priority protecting connections, as seen in step 555. In this step, the recalculated available bandwidth may be equal to the bandwidth pool reserved for all protecting connections multiplied by the difference of the number of users that can share the same unit of bandwidth, i.e. the over-subscription factor "N", and the number of low-priority connections using this bandwidth unit already, including the newly requested connection. Finally, the recalculated aggregated available bandwidth available for protecting connections 126 can be advertised in a link state advertising message in step 590 transmitted to the other nodes 20 in the mesh network 21.

If the requested connection in step 540 is not a high-priority protecting connection 62a, then the sequence moves to step 570 and determines if the requested connection is a low-priority protecting connection 62b. If the requested connection is a low-priority protecting connection 62b, then the sequence moves to step 575 and compares the amount of required unreserved bandwidth in the connection request to an low-priority protecting connections available bandwidth 124 on the intermediate node 502. If the requested low-priority protecting connections 62b required bandwidth is less than or equal to the low-priority protecting connections available bandwidth 124 on the intermediate node 502, then the request will be approved and the request will be forwarded to the next node 20, as shown in sequence step 585.

Additionally, in step 580, the intermediate node 502, recalculates the available bandwidth that can be shared for low-priority protecting connections 62b. The recalculated available bandwidth can be equal to the bandwidth pool reserved for all protecting connections multiplied by the difference of the number of users that can share the same unit of bandwidth, i.e. the over-subscription factor "N", and the number of low-priority connections using this bandwidth unit already, including the newly requested connection. Finally, the recalculated aggregated available bandwidth available for protecting connections can be advertised in a link state advertising message in step 590 transmitted to the other nodes in the mesh network 21. However, if the available bandwidth for any type of requested connection (working connection 60, high-priority protecting connection 62a, or low-priority protecting connection 62b) is greater than the available bandwidth for that type of connection, then the sequence moves to step 595 which rejects the requested connection and notifies the sender of the rejection.

Figure 10:
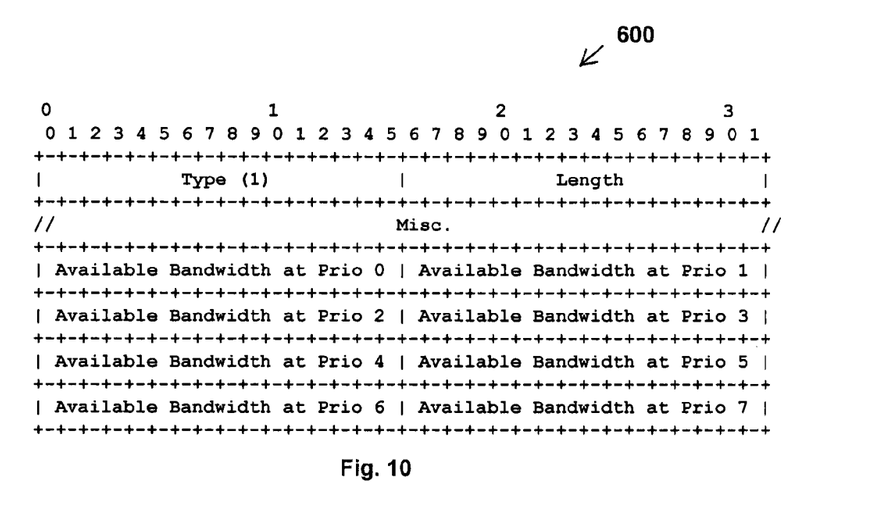
FIG. 10 is a schematic diagram of an exemplary link state advertising message transmitted by a switch node to inform other switch nodes within the mesh network of bandwidth information per connection type.

FIG. 10 is a schematic diagram of an exemplary link state advertising message 600 transmitted by one of the nodes 20 to inform other switch nodes 20 within the mesh network 21 of bandwidth information per connection type. The advertising message 600 contains information for available bandwidth at numerous priority levels and is capable of advertising all possible bandwidths at all priority levels through the control plane of the nodes 20 on the mesh network 21.

Figure 11:
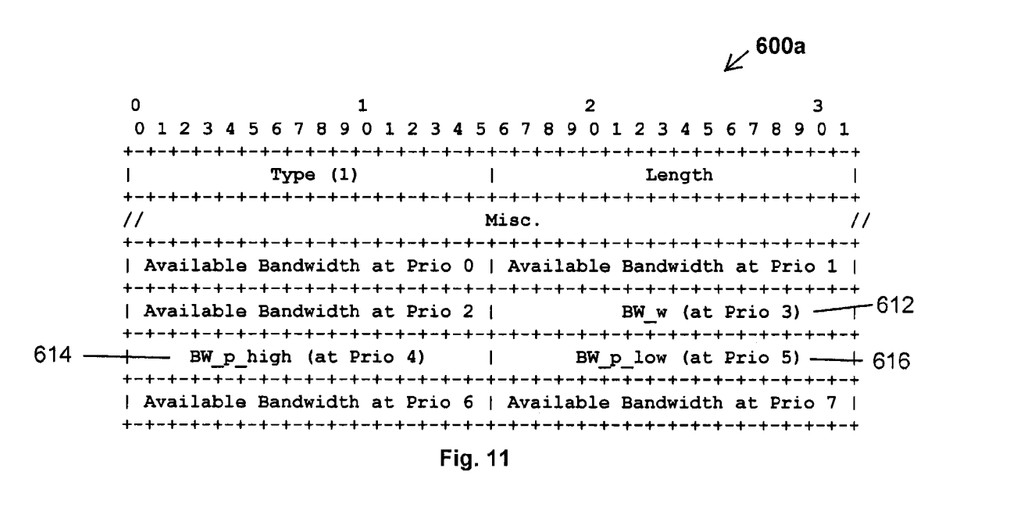
FIG. 11 is a schematic diagram of an example of an advertising message transmitted by a switch node to inform other switch nodes of bandwidth information for working connections, high-priority protecting connections, and low-priority protecting connections.

FIG. 11 is a schematic diagram of a specific advertising message example 600a of advertising message 600 which contains protecting connections aggregate bandwidth information, which can be available bandwidth that is scaled by the over-subscription factor (N). In this embodiment, three bandwidth priority levels are identified—working connection bandwidth 612, high-priority protecting connection bandwidth 614, and low-priority protecting connection bandwidth 616—in descending order of priority. Though the advertising message example 600a shows the working connection bandwidth at priority three, the high-priority protecting connection bandwidth at priority four, and the low-priority protecting connection bandwidth at priority five, the connection bandwidths may be at any priority as long as the working connection bandwidth 612 is a higher priority than the high-priority protecting connection bandwidth 614, and the high-priority protecting connection bandwidth 614 is a higher priority than the low-priority protecting connection bandwidth.

CONCLUSION

Conventionally, an operator would allocate a common set of network resources such as timeslots on nodes 20 to set up optical channel data unit label switched paths, however, there was not a known mechanism enhancing utilization of bandwidth by advertising aggregate available bandwidth. In accordance with the present disclosure, nodes (such as nodes 20-A-20-K shown in FIG. 2) advertise multiple priority connections' bandwidth, including individual bandwidths, aggregate bandwidths based on an over-subscription factor for a type of connection, and as an aggregate bandwidth for a category of connections based on an over-subscription factor. The exemplary embodiment advertises both aggregate high and aggregate low priority protecting connection bandwidth as well as combined aggregate protecting connection bandwidth. Consistent with the present disclosure, such bandwidth advertisement may be made for any number of different priority connections.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Also, certain portions of the implementations may have been described as "components" or "circuitry" that perform one or more functions. The term "component" or "circuitry" may include hardware, such as a processor, an application specific integrated circuit (ASIC), or a field programmable gate array (FPGA), or a combination of hardware and software.

Further, while implementations have been described in the context of an optical network, this need not be the case. These implementations may apply to an electronic network using copper cabling, or even a wireless network.

In addition, information regarding the optical channel data unit label switched paths can be stored and processed in a distributed fashion, or in a centralized fashion. For example, time slot information for the different multiplexing levels within the multiplexing hierarchy can be stored in 'Generalized Label Object' in respective PSB and RSB control blocks (PSB represents 'PATH state' and RSB represents 'RESV state'). The time slot information can be stored in a distributed fashion (distributed storage having multiple memory/storage devices) and processed in a distributed manner preferably by using a hop-to-hop processing. In another implementation, the distributed storage may be replaced by a centralized memory that stores the time slot information for all, or a subset, of the nodes 20. In this situation, the nodes 20 may include communication paths to obtain the connection information from the centralized memory.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

REFERENCES

The following references are hereby incorporated herein by reference:

[Reference 1] ITU-T Recommendation G.709 "Interfaces for the optical transport network (OTN)".

[RFC2119] Bradner, S., "Key words for use in RFCs to Indicate Requirement Levels".

[RFC3630] Katz, D., Kompella, K., and D. Yeung, "Traffic Engineering (TE) Extensions to OSPF Version 2", RFC 3630

[RFC3471] Berger, L., "Generalized Multi-Protocol Label Switching (GMPLS) Signaling Functional Description", RFC 3471, January 2003.

[RFC3945] Mannie, E., "Generalized Multi-Protocol Label Switching (GMPLS) Architecture", RFC 3945, October 2004.

[RFC4125] Faucheur, F. Le, and Lai, W., "Maximum Allocation Bandwidth Constraints Model for Diffserv-aware MPLS Traffic Engineering", RFC 4125, June 2005.

[RFC4127] Faucheur, F. Le (Editor), Russian Dolls Bandwidth Constraints Model for Diffserv-aware MPLS Traffic Engineering, RFC 4127, June 2005.

[RFC4201] Kompella, K., Rekhter, Y., and L. Berger, "Link Bundling in MPLS Traffic Engineering (TE)"

[RFC4203] Kompella, K. and Y. Rekhter, "OSPF Extensions in Support of Generalized Multi-Protocol Label Switching (GMPLS)"

[RFC4204] Lang, J., Ed., "Link Management Protocol (LMP)", RFC 4204, October 2005.

[RFC4328] Papadimitriou, D., "Generalized Multi-Protocol Label Switching (GMPLS) Signaling Extensions for G.709 Optical Transport Networks Control", RFC 4328, January 2006.

[RFC5339] Le Roux, J L. and D. Papadimitriou, "Evaluation of Existing GMPLS Protocols against Multi-Layer and Multi-Region Networks (MLN/MRN)", RFC 5339, September 2008.

[G.709-v3] ITU-T, "Interfaces for the Optical Transport Network (OTN)", G.709 Recommendation, December 2009.

[G.709-v1] ITU-T, "Interface for the Optical Transport Network (OTN)," G.709 recommendation (and Amendment 1), February 2001 (October 2001).

[G.872] ITU-T, "Architecture of optical transport networks", November 2001 (November 2001).

What is claimed is:

1. A method comprising the steps of:
generating, by circuitry of a first node, a link state advertising message including bandwidth information indicative of unreserved bandwidth for a protecting connection supported by an interface of the first node, wherein the bandwidth information of the link state advertising message includes an aggregate bandwidth of a link available for the protecting connection, the aggregate bandwidth being based on an available bandwidth of the link and an over-subscription factor such that the aggregate bandwidth exceeds the available bandwidth, the over-subscription factor being based on a number of users sharing a unit of the available bandwidth; and transmitting the link state advertising message from the first node to second nodes within a mesh network.

2. The method of claim 1, wherein the protecting connection is a first protecting connection, and wherein prior to the step of generating, the method further comprises the steps of:

receiving, by circuitry of the first node, a connection request for setting up a second protecting connection;

reserving bandwidth on the first node for the second protecting connection; and calculating aggregate bandwidth available for the first protecting connection.

3. The method of claim 1, wherein the protecting connection is a first priority protecting connection and the aggregate bandwidth is a first aggregate bandwidth for the first priority protecting connection, and wherein the first node supports the first priority protecting connection and a second priority protecting connection, and wherein the link state advertising message includes a second aggregate bandwidth for the second priority protecting connection.

4. The method of claim 1, wherein the first node supports a first priority protecting connection and a second priority protecting connection, and wherein the aggregate bandwidth is indicative of both a first aggregate bandwidth for the first priority protecting connection and a second aggregate bandwidth for the second priority protecting connection.

5. The method of claim 3, wherein the first node also supports a working connection, and wherein the link state advertising message includes an amount of unreserved bandwidth available for use by the working connection.

6. The method of claim 5, wherein the working connection is defined as having a first set of intermediate nodes and communication links, and wherein the first priority protecting connection is a high-priority protecting connection having a second set of intermediate nodes and communication links, the first set being a complement of the second set whereby intermediate nodes and communication links within the first set are not in the second set.

7. The method of claim 5, wherein the working connection is defined as having a first set of intermediate nodes and communication links, and wherein the second priority protecting connection is a low-priority protecting connection having a second set of intermediate nodes and communication links, the first set being different from the second set.

8. A method comprising the steps of:

generating, by circuitry of a first node, a link state advertising message including bandwidth information indicative of unreserved bandwidth for a first protecting connection having a first priority supported by an interface of the first node, wherein the bandwidth information of the link state advertising message includes aggregate bandwidth available for the first protecting connection, the aggregate bandwidth being based on available bandwidth and an over-subscription factor such that the aggregate bandwidth exceeds the available bandwidth, wherein the aggregate bandwidth is based on available bandwidth for the first priority protecting connection and a second priority protecting connection, the over-subscription factor being based on a number of users sharing a unit of the available bandwidth; and transmitting the link state advertising message from the first node to second nodes within a mesh network.

9. The method of claim 8, wherein the first node also supports a working connection, and wherein the link state advertising message includes an amount of unreserved bandwidth available for use by the working connection.

10. The method of claim 9, wherein the working connection is defined as having a first set of intermediate nodes and communication links, and wherein the first priority protecting connection is a high-priority protecting connection having a second set of intermediate nodes and communication links, the first set being a complement of the second set whereby intermediate nodes and communication links within the first set are not in the second set.

11. The method of claim 9, wherein the working connection is defined as having a first set of intermediate nodes and communication links, and wherein the second priority protecting connection is a low-priority protecting connection having a second set of intermediate nodes and communication links, the first set being different from the second set.

12. A node, comprising:

an input interface supporting a first plurality of different types of signals for receiving traffic from a first link;

an output interface supporting a second plurality of different types of signals for transmitting traffic to a second link;

a switch for communicating the traffic from the input interface to the output interface; and a control module controlling the input interface in accordance with GMPLS protocols, the output interface and the switch, the control module generating a link state advertising message including bandwidth information indicative of unreserved bandwidth on the node for a protecting connection, wherein the bandwidth information of the link state advertising message includes aggregate bandwidth available on the node for the protecting connection, the aggregate bandwidth being based on available bandwidth on the node and an over-subscription factor such that the aggregate bandwidth exceeds the available bandwidth, the over-subscription factor being based on a number of users sharing a unit of the available bandwidth.

13. The node of claim 12, wherein the input interface supporting also receipt of a connection request, and wherein the control module also calculates aggregate bandwidth available for the protecting connection.

14. The node of claim 12, wherein the protecting connection is a first priority protecting connection and the aggregate bandwidth is a first aggregate bandwidth for the first priority protecting connection, and wherein the node supports the first priority protecting connection and a second priority protecting connection, and wherein the link state advertising message includes a second aggregate bandwidth for the second priority protecting connection.

15. The node of claim 14, wherein the node also supports a working connection, and wherein the link state advertising message includes an amount of unreserved bandwidth available for use by the working connection.

16. The node of claim 15, wherein the working connection is defined as having a first set of intermediate nodes and communication links, and wherein the first priority protecting connection is a high-priority protecting connection having a second set of intermediate nodes and communication links, the first set being a complement of the second set whereby intermediate nodes and communication links within the first set are not in the second set.

17. The node of claim 15, wherein the working connection is defined as having a first set of intermediate nodes and communication links, and wherein the second priority protecting connection is a low-priority protecting connection having a second set of intermediate nodes and communication links, the first set being different from the second set.

18. A node, comprising:
an input interface supporting a first plurality of different types of signals for receiving traffic from a first link;
an output interface supporting a second plurality of different types of signals for transmitting traffic to a second link;
a switch for communicating the traffic from the input interface to the output interface; and
a control module utilizing GMPLS protocols and controlling the input interface, the output interface and the switch, the control module generating a link state advertising message including bandwidth information indicative of unreserved bandwidth for a first priority protecting connection, wherein the bandwidth information of the link state advertising message includes aggregate bandwidth available for the first priority protecting connection, the aggregate bandwidth being based on available bandwidth and an over-subscription factor such that the aggregate bandwidth exceeds the available bandwidth, wherein the aggregate bandwidth is based on available bandwidth for the first priority protecting connection and a second priority protecting connection, and the over-subscription factor being based on a number of users sharing a unit of the available bandwidth.

19. The node of claim 18, wherein the first node also supports a working connection, and wherein the link state advertising message includes data indicative of an amount of unreserved bandwidth available for use by the working connection.

20. The node of claim 19, wherein the working connection is defined as having a first set of intermediate nodes and communication links, and wherein the first priority protecting connection is a high-priority protecting connection having a second set of intermediate nodes and communication links, the first set being a complement of the second set whereby intermediate nodes and communication links within the first set are not in the second set.

21. The node of claim 19, wherein the working connection is defined as having a first set of intermediate nodes and communication links, and wherein the second priority protecting connection is a low-priority protecting connection having a second set of intermediate nodes and communication links, the first set being different from the second set.

* * * * *